Patented Dec. 22, 1953

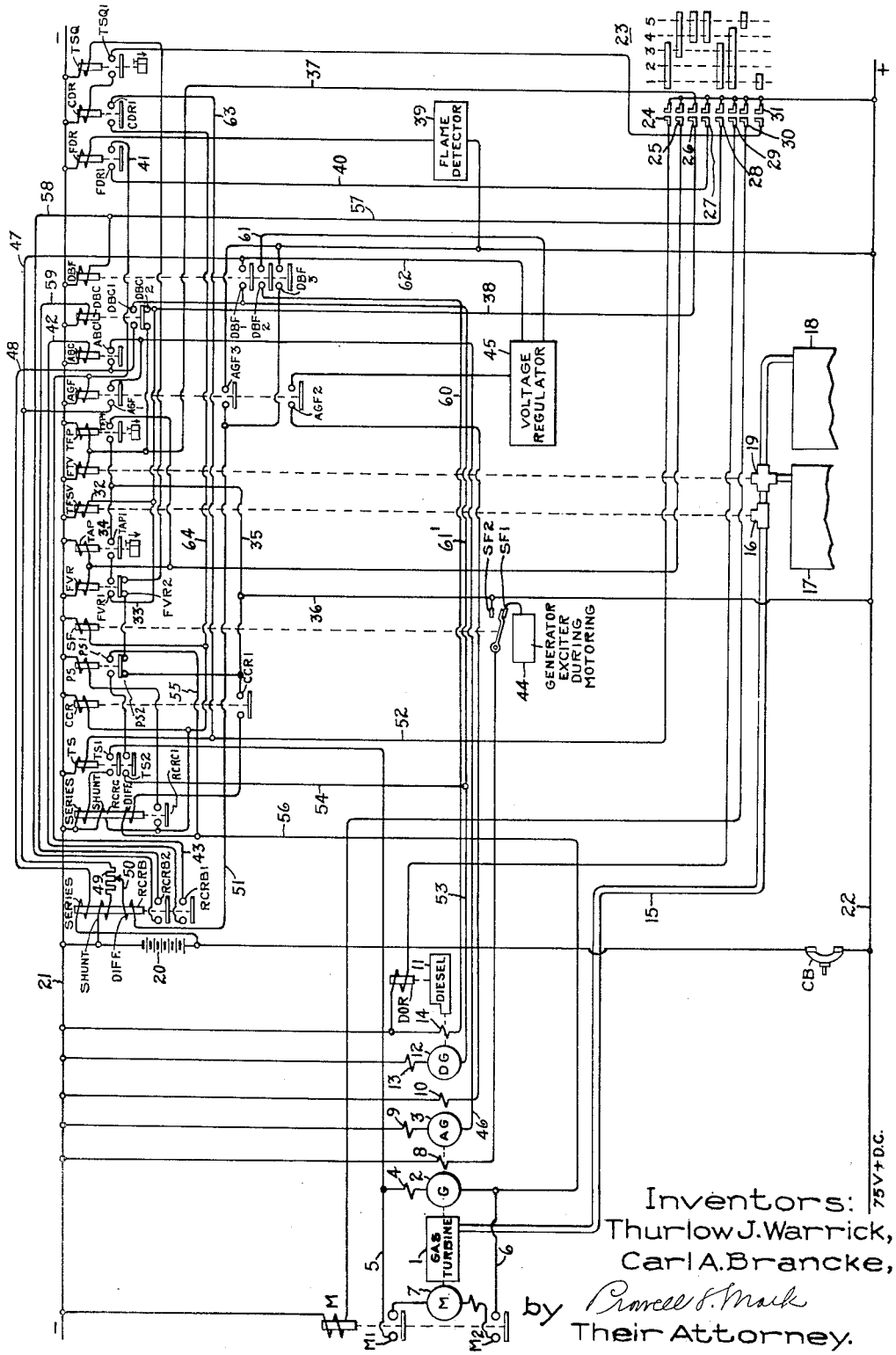

2,663,803

UNITED STATES PATENT OFFICE 2,663,803

SYSTEM FOR SHUTTING DOWN AND OPERATING THERMAL PRIME MOVERS

Thurlow J. Warrick, Erie, and Carl A. Brancke, North East, Pa., assignors to General Electric Company, a corporation of New York Application July 2, 1952, Serial No. 296,828

19 Claims. (Cl. 290—4)

This invention relates to thermal prime movers, such as gas turbines, and more specifically to a system for shutting down an operating thermal prime mover.

It is well known that thermal prime movers, such as gas turbines, may be cranked for a certain period after combustion has ceased in order to prevent warping of the shaft. This cranking during the shutting down operation is commonly referred to as "cool-down cranking." In the conventional central station type of installation, the turbine is cranked during the cool-down period, as well as in starting, by a cranking motor, an adequate supply of electrical power being available. When the turbine is installed in a self-propelled vehicle, however, such as a gas-turbine-electric locomotive, the locomotive batteries are not adequate to furnish power to a cranking motor and other means must therefore be provided to furnish the cool-down cranking. Since the locomotive gas turbine is connected to drive one or more traction generators, it is feasible to energize one of these generators as a motor for cranking, both during starting and shutdown, and this generator may be energized by an auxiliary generator driven by an auxiliary prime mover, such as a diesel engine. Furthermore, in the gas turbine-electric locomotive installation, it is desirable that the various steps in the shutdown sequence be accomplished automatically in the event that the engineman desires to completely shut down the turbine and the system should also provide sequential performance of the various steps under the control of the engineman with the provision of minimum supervisory control equipment.

It is therefore an object of this invention to provide an improved system for shutting down an operating thermal prime mover.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in its broadest aspects, provides a thermal prime mover, such as a gas turbine, mechanically connected to drive a main generator and an auxiliary generator. An auxiliary prime mover, such as a diesel engine, is also provided mechanically connected to drive another auxiliary generator. Two sources of fuel are provided for the turbine, such as diesel fuel and Bunker C fuel, with a first valve arranged to admit fuel to the turbine and a transfer valve arranged to select either the diesel fuel or the Bunker C fuel. When the turbine is operating, the turbine-driven auxiliary generator is charging the batteries and the transfer valve is admitting Bunker C fuel to the turbine, the diesel being shut down. The shutting down system provides means actuated by a supervisory control means for starting the diesel and for transferring battery-charging from the turbine-driven auxiliary generator to the diesel-driven auxiliary generator. As soon as battery charging is transferred to the diesel-driven auxiliary generator, the fuel transfer valve is de-energized to transfer from Bunker C type to diesel-type turbine fuel. Time delay means are provided arranged to de-energize the other fuel valve to shut off the diesel fuel from the turbine a predetermined length of time after the transfer from Bunker C type to diesel type fuel. As soon as the turbine decelerates to a predetermined speed level, for example, 5 to 6 percent of full speed, a speed-responsive arrangement, which may be a device responsive to the main generator voltage, operates to connect the diesel-driven auxiliary generator to the main generator to operate the main generator as a shunt-excited motor for the cool-down cranking of the gas turbine. Another time delay device is provided to break this connection a predetermined length of time after operation of the speed-responsive means to allow the turbine to coast to a stop.

The supervisory control means may be a multiple-position circuit controller which connects the various components for operation of the turbine in a first position. The auxiliary diesel is started in the second position of the controller and battery charging is transferred from the turbine-driven auxiliary generator to the diesel-driven auxiliary generator in the third controller position. The circuit establishing device which connects the diesel-driven auxiliary generator to the main generator for cool-down cranking is also connected for energization in the third controller position, however, it is prevented from being actuated until the turbine speed falls to a predetermined level. The fuel transfer valve is de-energized in the third controller position to effect transfer from Bunker C type to diesel type fuel and the other fuel valve is de-energized in the second controller position to shut off all fuel from the turbine, de-energization of this valve being delayed, however, by time delay means until a predetermined time after de-energization of the fuel transfer valve. With the controller in the second position and all fuel shut off from the turbine, the turbine will decelerate and when the predetermined speed is reached, a speed-responsive device will energize the circuit establishing means to set up the circuit to connect the diesel-driven auxiliary generator to the main generator for cool-down cranking. In the first controller position, the cool-down cranking is initiated and a time delay device is actuated which will break the connection between the diesel-driven auxiliary generator and the main generator a predetermined time after establishment of the connection, for example, 10 minutes.

To summarize, the auxiliary diesel is first started and battery charging is then transferred from the turbine-driven auxiliary generator to the diesel-driven auxiliary generator. Fuel is then transferred from Bunker C type to diesel type and after a time delay the diesel fuel is shut off. When the turbine decelerates to a predetermined speed level, the diesel-driven generator is connected to the main generator for cool-down cranking and after a predetermined cranking period, the connection is then broken, the diesel generator continuing to run charging the batteries. The turbine may have been started in any convenient manner, for example, by the turbine starting system described in my copending application Serial No. 299,682, filed July 18, 1952, assigned to the assignee of the present application.

The single figure of the drawing diagrammatically illustrates the improved thermal prime mover shut-down system of this invention.

Referring now to the drawing, there is shown a gas turbine 1 mechanically connected to drive a traction generator 2 and an auxiliary generator 3. The main generator 2 is provided with a commutating field exciting winding 4 and may be connected to energize a plurality of traction motors by means of lines 5 and 6, one of such motors being shown schematically at 7 with contacts M1 and M2 of power contactor M connecting the motor 7 for energization from the main generator 2. The motor connections normally utilized in a self-propelled traction vehicle form no part of this invention and therefore will not be more fully described. The main generator 2 is provided with a shunt field winding 8 and the auxiliary generator 3 is provided with a commutating field exciting winding 9 and a shunt field exciting winding 10. An auxiliary diesel 11 is provided mechanically connected to drive an auxiliary generator 12 having a commutating field exciting winding 13 and a shunt field exciting winding 14. The diesel 11 is arranged to be started, operated and shut down by an operating device DOR, the actual means for starting the diesel whether it be compressed air or a cranking motor forming no part of this invention and will thus not be more fully described. The turbine 1 is supplied with fuel through a fuel supply line 15 having fuel valve 16 arranged therein. Two sources of fuel are provided, such as diesel fuel and Bunker C fuel, shown as fuel tanks 17 and 18. A fuel transfer valve 19 is arranged to selectively connect either the source 18 or the source 17 to the turbine 1. The fuel valve 16 is operated by a solenoid TFSV, the valve being open when the TFSV coil is energized to admit fuel to the turbine and closed to shut off fuel when the TFSV coil is de-energized. The fuel transfer valve 19 is operated by solenoid FTV with Bunker C type fuel being supplied from the tank 18 when the FTV coil is energized and diesel-type fuel being supplied from tank 17 when the FTV coil is de-energized. Control power is supplied by a battery 20 connected to the negative control line 21 and positive control line 22, with circuit breaker CB being arranged in series with the positive side of the battery.

The connection and functioning of the remaining components and devices can best be described in connection with the description of the operation of the system. In order to initiate the shutdown sequence, a circuit controller 23 is provided having a plurality of cam-actuated contacts 24 through 31 inclusive. This controller may be either manually actuated by the engineman or arranged to be pilot-motor driven. The controller 23 may include other contacts (not shown) used in the starting sequence, as more fully described in my aforesaid copending application Serial No. 299,682.

It will be seen that in the fifth or running position of the controller 23, contacts 25, 26, 27 and 30 are closed. Contact 30 connects the operating coil of contact M between the positive control line 22 and the negative control line 21 to close contactes M1 and M2 connecting motor 7 across main generator 2. Contact 25 being closed connects the operating coils of fuel valve relay FVR and time air purge relay TAP across positive control line 22 and negative control line 21. It will be seen that the closing of fuel valve relay contact FVR-1 and time air purge relay contact TAP-1 connects valve operator TFSV for energization through lines 32, 33, 34, 35, and 36. Time air purge relay TAP has a predetermined time delay on dropout, for example, 4 minutes, as will be hereinafter described. Energization of operator TFSV operates fuel valve 16 to open fuel line 15. Closing of contact 26 of controller 23 connects fuel transfer valve operator FTV and time fuel purge relay TFP for energization through lines 37, 38, 33, contact FVR-1 of fuel valve relay FVR, contact TAP-1 of time air purge relay TAP, and lines 34, 35 and 36. Energization of fuel transfer valve operator FTV actuates the fuel transfer valve 19 to admit Bunker C fuel to the fuel supply line 15 from the tank 18. Time fuel purge relay TFP is provided with predetermined time delay on dropout, for example, 2 minutes, as will be hereinafter described. It will be seen that flame detector relay FDR is connected across negative supply line 21 and positive supply line 22 through the flame detector 39 and since the turbine is operating in the fifth position of controller 23, flame detector relay FDR will be picked up closing its contacts FDR-1. Contact 27 of controller 23 is closed in the fifth position, thus energizing relay AGF through line 40, flame detector relay contact FDR-1, and line 41. Relay ABC is connected across relay AGF through lines 42 and 43 with contact RCRB-1 of reverse current relay RCRB being interposed in series therewith.

It is thus seen that fuel valve relay FVR, time air purge relay TAP, fuel valve operator TFSV, fuel transfer valve operator FTV, time fuel purge relay TFP, and relays AGF, ABC and FDR along with motor contactor M are energized in the fifth or operating position of the controller 23. The relay SF, being connected for energization through contact 24, is not energized in the fifth position of controller 23 and, therefore, contact SF-1 will be closed connecting the shunt field 8 of main generator 2 to exciter 44. This exciter, which is used during motoring, forms no part of this invention and will not be more fully described. Diesel operator DOR is connected for energization through contact 29 of controller 23 and since this contact is not closed in the fifth controller position, DOR is not energized and the diesel 11 is not operating. It will be seen that shunt field winding 10 of auxiliary generator 3 is connected across negative supply line 21 and the voltage regulator 45 through contact AGF-2 of relay AGF which, as noted above, is picked up in the fifth position of controller 23 since contact 27 is closed. One side of the armature of auxiliary generator 3 is connected to negative control line 21 and the other side is connected to the voltage regulator 45 through line 46, contact AGF-1 of relay AGF and line 47. The auxiliary generator 3 is also connected to the positive side of battery 20 through line 46, contact ABC-1 of relay ABC, line 48 and the series coil of reverse current relay RCRB. A shunt coil of reverse current relay RCRB is connected to negative control line 21 and potentiometer 49, the other end of which is connected to the voltage regulator 45 through line 47. The differential coil of reverse current relay RCRB is connected to tap 50 of potentiometer 49 and the positive control line 22 through line 51 and contact AGF-3 of relay AGF.

It is thus seen that in the fifth position of controller 23, motor contactor M is closed connecting motor 7 across the armature of main generator 2 and that the shunt field 8 of main generator 2 is connected to the motoring exciter 44 through contact SF-1. The armature of the turbine-driven auxiliary generator 3 is connected to charge battery 20 through contact ABC-1 of relay ABC and to the voltage regulator 45 through contact AGF-1 of relay AGF. The shunt field 10 of auxiliary generator 3 is connected to the voltage regulator 45 for energization through contact AGF-2 of relay AGF. The shunt coil of reverse current relay RCRB is energized since contact AGF-3 is closed, thus closing its contact RCRB-1 to energize relay ABC which as indicated above connects the armature of turbine-driven auxiliary generator 3 to the battery 20 for charging. It will now be apparent that in the fifth controller position, the turbine is operating on Bunker C type fuel with the auxiliary generator connected to charge the battery and the diesel 11 shut down.

When the engineman moves the controller 23 to the fourth position, it is seen that contact 30 is opened, de-energizing motor contactor M to disconnect the motor 7 from the main generator 2. Contact 29 is closed in the fourth position, energizing diesel operator DOR to start and run diesel 11. Contact 27 is still closed in the fourth controller position and relays AGF and ABC are still energized connecting turbine-driven auxiliary generator 3 to the battery 20 for charging. Contact 26 of controller 23 is still closed in the fourth position and thus fuel valve relay FVR is still energized, energizing fuel valve operator TFSV so that valve 16 is still open. Time air purge relay TAP is also still energized. Contact 26 is still closed so fuel transfer valve operator FTV is still energized thus actuating fuel transfer valve 19 to continue to admit Bunker C fuel from the tank 18 to the fuel supply line 15 and time fuel purge relay TFP is still energized. It is thus seen that in the fourth position of controller 23, the turbine 1 is still idling on Bunker C fuel. However, the motor 7 is no longer connected to the main generator 2 and the diesel 11 has been started and is running at no load. The auxiliary generator 3 is, however, still connected to charge the battery 20.

Moving the controller 23 to the third position causes contact 24 to energize contactor TS through line 52. It will be seen that TS picking up closes contact TS-1 connecting one side of the armature of main generator 2 to negative control line 21 through the series coil of reverse current relay RCRC. One side of the diesel generator 12 is connected to the negative control line 21 and the other side is connected to main generator 2 through lines 53, 54, contact TS-2 of contactor TS, contact PS-1 of contactor PS, line 55, and line 56. Thus, energizing of contactor TS-1 closing its contacts TS-1 and TS-2 sets up a circuit connecting diesel generator 12 to main generator 2 for cranking with only the contact PS-1 remaining to be closed. Contact 25 is still closed in the third controller position, thus fuel valve relay FVR and time air purge relay TAP are still picked up. Fuel valve operator TFSV is thus still energized and fuel valve 16 is still open. Contact 26 of controller 23 has opened, however, in the third switch position, thus de-energizing fuel transfer valve operator FTV and time fuel purge relay TFP, provided relay DBC has picked up, as will be hereinafter described. De-energization of fuel transfer valve operator FTV actuates fuel transfer valve 19 to disconnect tank 18 from fuel supply line 15 and to connect tank 17 thereto to supply diesel fuel to the turbine 1. De-energization of time fuel purge relay TFP initiates its time delay dropout which may be any predetermined desirable time, such as 2 minutes. Contact 27 of controller 23 is open in the third position, thus de-energizing relays AGF and ABC to disconnect auxiliary generator 3 from the battery 20. Contact 28 of the controller is closed, however, in third position, energizing relay DBF through line 57 and relay DBC which is connected across relay DBF by means of lines 58 and 59, contact RCRB-2 of reverse current relay RCRB being interposed in series therewith. Contact DBF-3 of relay DBF is in parallel with contact AGF-3 of relay AGF and thus connects the differential coil of reverse current relay RCRB for energization. Picking up of this relay closing its contact RCRB-2 thus energizes relay DBC. Contact DBF-2 of relay DBF connects the shunt field winding 14 of the diesel generator 12 to the voltage regulator 45 for energization through lines 60 and 61. Contact DBF-1 of relay DBF connects the armature of the diesel generator 12 to the voltage regulator 45 through lines 61' and 62. Contact DBC-1 connects the armature of the diesel generator 12 to the positive side of the battery 20 through line 61', and 48 with the series coil of reverse current relay RCRB being arranged in series therewith.

It is thus seen that in the third controller position battery charging is transferred from the turbine-driven auxiliary generator 3 to the diesel-driven auxiliary generator 12 and that the turbine fuel is transferred from Bunker C to diesel type. Thus it will be seen that contact TFP-1 of time fuel purge relay TFP is connected across contact 25 of controller 23 and thus, if the contact 25 is opened, the time delay dropping out of relay TFP would de-energize fuel valve relay FVR a predetermined time, for example, the 2 minute dropout time of TFP, after de-energization of fuel transfer valve operator FTV. The de-energization of fuel valve relay FVR, of course, in turn de-energizes fuel valve operator TFSV to shut off valve 16. Thus, as will be more fully hereinafter described, that if contact 25 is opened, time fuel purge relay TFP will automatically de-energize fuel valve relay FVR and fuel valve operator TFSV to shut off diesel fuel from the turbine 1 a predetermined time after transfer from Bunker C to diesel type fuel.

In the second position of controller 23, contact 24 is still closed thus energizing contactor TS closing its contacts TS-1 and TS-2 and the circuit of the main generator 2 and the diesel-driven generator 12. Contact 25 in the circuit of fuel valve relay FVR and time air purge relay TAP is open in the second position, and thus if the dropout time of time fuel purge relay TFP has elapsed and the relay is timed out opening its contact TFP-1 which is across contact 25, fuel valve relay FVR will be de-energized opening its contact FVR-1 and time air purge relay TAP will also be de-energized opening its contact TAP-1 after the 4-minute time delay. Opening of contact FVR-1 de-energizes fuel valve operator TFSV to close valve 16 shutting off all fuel from the turbine 1. It will be noted that time air purge relay TAP has a time delay on dropout, for example, 4 minutes, for a purpose to be hereinafter described. Contact 29 is still closed in the second position energizing relays DBF and DBC to connect the diesel generator 12 to the battery 20 for charging and contact 29 is, of course, still closed energizing diesel operator DOR so that the diesel is running. It will be noted that power switch PS is not yet picked up and therefore its contact PS-2 is still closed and since fuel valve relay FVR has dropped out, its contact FVR-2 also will be closed. These two contacts are arranged in series with the operating coil of time sequence relay TSQ so that this relay, which has a time delay on dropout, for example, 10 minutes, is now energized. Picking up of TSQ closes its contact TSQ-1 in the circuit of cool-down relay CDR. Thus, in the second switch position, all fuel is shut off from the turbine and the turbine is decelerating with the diesel generator charging the battery.

In the first position of controller 23, contact 31 is closed, thus picking up cool-down relay CDR through contact TSQ-1 of time sequence relay TSQ. Contact 24 of controller 23 is still closed, and thus relay CCR is energized through lines 52, 63, contact CDR-1 of cool-down relay CDR, and line 64. Relay SF is also energized in a similar manner, opening its contact SF-1 disconnecting the shunt field 8 of the main generator 2 from the exciter 44 and closing contact SF-2 to connect the shunt field winding 8 of main generator 2 across control supply lines 21 and 22 for energization. The shunt coil of reverse current relay RCRC is also energized from line 64. Picking up of relay CCR closes its contact CCR-1 in the circuit of the differential coil of reverse current relay RCRC which it is seen is connected between the armature of main generator 2 and positive control line 22 by means of contact CCR-1. When the turbine speed falls to a predetermined level to provide the proper voltage across the differential coil of reverse current relay RCRC, for example 5 to 6 percent of full speed, reverse current relay RCRC will pick up closing its contact RCRC-1 to energize power switch PS. With contactor PS picked up closing its contact PS-1, the diesel-driven generator 12 is connected to the main generator 2 to crank the turbine at the desired cool-down cranking speed, for example, 5 to 6 percent of full speed. Picking up of contactor PS opens its normally closed interlock PS-2 connected in series with normally closed interlock FVR-1 of fuel valve relay FVR and the coil of time sequence relay TSQ. Time sequence relay TSQ is thus de-energized and, as pointed out above, since this relay has a time delay on dropout, for example, 10 minutes, contact TSQ-1 will remain closed so that cool-down relay CDR is still energized. When time sequence relay TSQ times out after the predetermined period, its contact TSQ-1 opens dropping out cool-down relay CDR in turn opening its contact CDR-1. As can be seen, this de-energizes relay CCR opening its contact CCR-1, dropout relay SF opening its contact SF-2 and closing its contact SF-1 and also de-energizes the shunt coil of reverse current relay RCRC. This in turn opens contact RCRC-1 to drop out contactor PS. This opens its contact PS-1 to disconnect the diesel-driven generator 12 from the main generator 2 to stop the cool-down cranking. The turbine will thereafter coast to a stop and the diesel will continue to operate with the diesel-driven generator 12 charging battery 20.

To summarize the step-by-step shutdown sequence produced by sequentially moving the circuit controller 23 from the fifth position to the first position, in the fifth or operating position the turbine 1 is running and the diesel 11 is shut down. Contacts 25, 26, 27 and 30 are closed in the fifth switch position. With contact 25 closed, fuel valve relay FVR and time air purge relay TAP are picked up in turn energizing fuel valve operating coil TFSV to open valve 16. With contact 26 closed, fuel transfer valve operator FTV and time fuel purge relay TFP are picked up operating fuel transfer valve 19 to admit Bunker C fuel to the turbine. Since contact 27 is closed, and since combustion is taking place in the turbine, energizing flame detector relay FDR and closing contact FDR-1, relay AGF is picked up connecting shunt field winding 10 of turbine-driven auxiliary generator 3 to the voltage regulator, the armature of turbine-driven auxiliary generator 3 to the voltage regulator, and the shunt winding of reverse current relay RCRB across the control lines 21 and 22. Relay ABC is thus picked up connecting turbine-driven auxiliary generator 3 across the battery 20 for charging.

In the fourth position of controller 23, contact 30 is opened de-energizing the motor contactor M and contact 29 has closed energizing diesel operator DOR to start the diesel 11. Contacts 25, 26 and 27 are still closed so that the turbine is still running on Bunker C fuel and the turbine-driven auxiliary generator 3 is still charging the battery.

In the third controller position, contact 27 is opened, de-energizing relays AGF and ABC to disconnect the turbine-driven auxiliary generator 3 from its battery-charging connection and relays DBF and DBC are picked up by virtue of the closing of contact 28 to connect the diesel-driven generator 12 across the battery for charging. Contact 26 is opened, and if the relay DBC has picked up opening its contact DBC-2 which is connected around the contact 27, the fuel transfer valve operator FTV is de-energized operating fuel transfer valve 19 to transfer from Bunker C fuel to diesel fuel. Contact 24 is closed in the third position picking up contact TS, setting up the circuit to connect the diesel generator 12 to the main generator 2. However, contactor PS is not yet picked up, so cool-down cranking is not begun. Time fuel purge relay TFP is de-energized in the third position by virtue of the opening of contact 26. However, it will not open for 2 minutes and thus its contact TFP-1 connected around contact 25 of controller 23 will prevent de-energization of fuel valve operator FVR and time air purge relay TAP for that period of time. Thus, in the third position, the turbine is running at idle speed on diesel fuel and the diesel generator is connected to charge the battery.

In the second switch position, contact 25 is opened de-energizing fuel valve relay FVR and time air purge relay TAP in the event that time fuel purge relay TFP has timed out. Dropping out of fuel valve relay FVR in turn drops out turbine fuel solenoid TFSV closing valve 16 to shut off all fuel from the turbine. De-energization of time air purge relay TAP with its 4-minute delay on dropout prevents reopening of the fuel valve 16 until sufficient air purging. Since contactor PS is not yet picked up so that its normally closed interlock PS-2 is still closed and since fuel valve relay FVR is now dropped out so that its normally closed interlock FVR-2 is closed, time sequence relay TSQ will pick up. Thus, in the second controller position, the turbine is decelerating and diesel generator 12 is charging the battery.

In the first controller position, contact 31 of contactor 23 closes to pick up cool-down relay CDR, time sequence relay TSQ being closed with its contact TSQ-1 also closed. Closing of contact CDR-1 of cool-down relay CDR picks up relays CCR, SF, and energizes the shunt coil of reverse current relay RCRC. Picking up of relay CCR closing its contact CCR-1 has connected the differential coil of reverse current relay RCRC between the armature of the main generator 2 and the positive control line 22 and when the main generator voltage drops to a predetermined level proportional to the desired speed at which cool-down cranking is to be started, for example, 5 to 6 percent of full speed, contact RCRC-1 of reverse current relay RCRC will pick up energizing contactor PS to complete the cranking connection between the diesel generator 12 and the main generator 2. Picking up of contactor PS and opening of its normally closed interlock PS-2 de-energizes time sequence relay TSQ which starts to time out. After its 10-minute dropout time, contact TSQ-1 will open de-energizing cool-down relay CDR which will in turn drop out relays CCR, SF and PS to disconnect the diesel generator from the main generator. The turbine then coasts to a stop and the diesel generator 14 continues to charge the battery 20.

The shutdown sequence described above is provided with a step-by-step operation of the controller 23 from the fifth position to the first position. It is also possible with this improved system to move the controller 23 from the fifth position to the first position in one move and the turbine will be shut down in the same manner as described hereinabove, except with no pause between steps, thus accomplishing an automatic shutdown responsive to moving the controller 23 to the first position. It is pointed out above that in the fifth position the turbine is running and the diesel is shut down with the auxiliary generator 3 charging the battery. We have seen that in moving the controller 23 to the first position, contact 24 is closed energizing contactor TS picking up its contacts TS-1 and TS-2 to set up the diesel generator-main generator connection. Contact 28 is closed in the first position connecting the diesel generator 12 for battery charging and contact 29 is closed to energize the diesel operator DOR to start the diesel. Contact 31 is the remaining contact closed in the first position and thus cool-down relay CDR will be energized when time sequence relay TSQ is picked up. Contact 27 is opened thus dropping out relays AGF and ABC to disconnect the auxiliary generator 3 from the charging connection with the battery and contacts 25 and 26 are opened to eventually drop out fuel valve relay FVR, time air purge relay TAP, fuel valve operator TFSV, fuel transfer valve operator FTV, and time fuel purge relay TFP. Contact 30 is, of course, opened, dropping out the motor contactor M.

The automatic shutdown sequence initiated by moving the controller 23 from fifth position to first position will now be described. It has been noted that normally closed interlock DBC-2 of relay DBC is connected across contact 26 of controller 23. Contact 26 is opened in the first position, however, contact DBC-2 of relay DBC is still initially closed so that fuel transfer valve operator FTV and time fuel purge relay TFV are still energized. As soon as relay DBC picks up, however, opening its contact DBC-2, fuel transfer valve operator FTV is de-energized, thus operating valve 19 to transfer from Bunker C to diesel type fuel. Time fuel purge relay TFP now starts to time out and it is noted that its contact TFP-1 is across the contact 25 which is open in the first position. Until relay TFP times out, therefore, its contact TFP-1 will be closed and fuel valve relay FVR and time air purge relay TAP will still be picked up so that contacts TAP-1 and FVR-1 still will be closed, thus energizing fuel valve operator TFSV. As soon as time fuel purge relay TFP times out, however, fuel valve relay FVR and time air purge relay TAP will be de-energized, opening contacts TAP-1 and FVR-1, respectively, de-energizing fuel valve operator TFSV to close valve 16 thus shutting off all fuel from the turbine 1. The turbine now decelerates and it will be noted that the dropping out of fuel valve relay FVR closes its normally closed interlock FVR-2 to energize time sequence relay TSQ. This in turn closes its contact TSQ-1 and since as noted above, contact 31 of controller 23 is closed, cool-down relay CDR will pick up closing its contact CDR-1. This, in turn, picks up relays CCR and SF and energizes the shunt coil of reverse current relay RCRC. Picking up of relay CCR closing its contact CCR-1 connects the differential coil of RCRC relay across the armature of main generator 2 and the positive control line 22 and picking up of relay SF disconnects the shunt field 8 of main generator 2 from its connection with the exciter 44 and connects it across the control lines 21 and 22. It is thus seen that when the turbine decelerates to aprroximately 5 to 6 percent of its full speed, reverse current relay RCRC will pick up closing its contact RCRC-1 to energize contactor PS which, in turn, picks up closing its contact PS-1 to connect the diesel-driven generator 12 to the main generator 2 for cool-down cranking. Picking up of contactor PS opens its normally closed interlock PS-2 to de-energize time sequence relay TSQ which then starts to time out. After the 10-minute time delay dropout of relay TSQ, it will open its contact TSQ-1 dropping out cool-down relay CDR which in turn drops out relays CCR, SF and contactor PS to disconnect the diesel-driven generator 12 from the main generator 2. The turbine then coasts to a stop with the diesel generator 12 being connected to the battery for charging.

It is thus seen that moving the controller 23 from the fifth position to the first position in one step will initiate automatic shutdown of the turbine 1 while the step-by-step movement from the fifth position to the first position permits the system to be operated with the connections established in any one of the five positions, for example, in the fourth position, the turbine continues to run on Bunker C fuel with the diesel idling, in the third position the turbine idles on diesel fuel with the diesel generator charging the battery, in the second position the turbine decelerates with no fuel being introduced, and in the first position the cool-down cranking is provided for a predetermined time after which the turbine coasts to a stop.

It will now be readily apparent that this invention provides an improved and simplified system for shutting down and operating a gas turbine characterized by the automatic progression of the sequence when the controller is moved from the fifth to the first position and by the step-by-step progression responsive to step-by-step movement of the controller.

While we have shown and described a particular embodiment of this invention, further modifications and improvements will occur to those skilled in the art. We desire it to be understood, therefore, that this invention is not limited to the form shown and we intend in the appended claims to cover all modifications which do not depart from the spirit and scope of this invention.

What we claim as new and desire to secure by Letters Patent of the United States is:

1. A system for shutting down an operating main thermal prime mover having a main generator mechanically connected thereto comprising an auxiliary thermal prime mover having an auxiliary generator mechanically connected thereto, means arranged when actuated to start and operate said auxiliary prime mover, a source of fuel for said main prime mover, valve means arranged when actuated to connect said source of fuel to said main prime mover, means arranged to deactuate said valve means thereby to initiate shut-down of said main prime mover, circuit establishing means arranged when actuated electrically to connect said auxiliary generator to said main generator for operating the same as a motor to crank said main prime mover for cool-down cranking, speed-responsive means connected to actuate said circuit establishing means responsive to the speed of said prime mover falling below a predetermined level as a result of deactuation of said valve means, and time delay means connected to deactuate said circuit establishing means a predetermined time after actuation thereof.

2. A system for shutting down an operating main thermal prime mover having a main generator mechanically connected thereto comprising an auxiliary thermal prime mover having an auxiliary generator mechanically connected thereto, means arranged when actuated to start and operate said auxiliary prime mover, a source of a first type of fuel for said main prime mover, a source of a second type of fuel for said main prime mover, first valve means arranged when actuated to admit fuel to said main prime mover, second valve means arranged when actuated to connect said source of said first type of fuel to said main prime mover and when de-actuated to connect said source of second type of fuel to said main prime mover, means arranged to de-actuate said second valve means thereby to initiate shut-down of said main prime mover, first time delay means arranged to de-actuate said first valve means a predetermined time after de-actuation of said second valve means, circuit establishing means arranged when actuated electrically to connect said auxiliary generator to said main generator for operating the same as a motor to crank said main prime mover for cool-down cranking, speed-responsive means connected to actuate said circuit establishing means responsive to the speed of said main prime mover falling below a predetermined level as a result of de-actuation of said first valve means, and second time delay means connected to de-actuate said circuit establishing means a predetermined time after actuation thereof.

3. A system for shutting down an operating main thermal prime mover having a main generator mechanically connected thereto comprising an auxiliary thermal prime mover having an auxiliary generator mechanically connected thereto, a battery, first circuit establishing means arranged when actuated electrically to connect said auxiliary generator to said battery for charging, means arranged to actuate said first circuit establishing means thereby to initiate shut-down of said main prime mover, a source of fuel for said main prime mover, valve means arranged when actuated to connect said source of fuel to said main prime mover, means arranged to de-actuate said valve means responsive to actuation of said first circuit establishing means, second circuit establishing means arranged when actuated electrically to connect said auxiliary generator to said main generator for operating the same as a motor to crank said main prime mover for cool-down cranking, speed-responsive means connected to actuate said second circuit establishing means responsive to the speed of said prime mover falling below a predetermined level as a result of de-actuation of said valve means, and time delay means connected to de-actuate said second circuit establishing means a predetermined time after actuation thereof.

4. A system for shutting down an operating main thermal prime mover having a main generator mechanically connected thereto comprising an auxiliary thermal prime mover having an auxiliary generator mechanically connected thereto, a battery, first circuit establishing means arranged when actuated electrically to connect said auxiliary generator to said battery for charging, means arranged to actuate said first circuit establishing means thereby to initiate shut-down of said main prime mover, a source of fuel for said main prime mover, valve means arranged when actuated to connect said source of fuel to said main prime mover, first time delay means arranged to de-actuate said valve means a predetermined time after actuation of said first circuit establishing means, second circuit establishing means arranged when actuated electrically to connect said auxiliary generator to said main generator for operating the same as a motor to crank said main prime mover for cool-down cranking, speed-responsive means connected to actuate said second circuit establishing means responsive to the speed of said main prime mover falling below a predetermined level as a result of de-actuation of said valve means, and second time delay means connected to de-actuate said second circuit establishing means a predetermined time after actuation thereof.

5. A system for shutting down an operating main thermal prime mover having a main generator and a first auxiliary generator mechanically connected thereto comprising an auxiliary prime mover having a second auxiliary generator mechanically connected thereto, a battery, a first circuit establishing means arranged when actuated electrically to connect said first auxiliary generator to said battery for charging, second circuit establishing means arranged when actuated electrically to connect said second auxiliary generator to said battery for charging, means arranged to de-actuate said first circuit establishing means and to actuate said second circuit establishing means thereby to initiate shut-down of said main prime mover, a source of fuel for said main prime mover, valve means arranged when actuated to admit fuel to said main prime mover, third circuit establishing means arranged when actuated electrically to connect said second auxiliary generator to said main generator for operating the same as a motor to crank said main prime mover for cool-down cranking, means arranged to de-actuate said valve means responsive to actuation of said second circuit establishing means, speed-responsive means connected to actuate said third circuit establishing means responsive to the speed of said main prime mover falling below a predetermined level as a result of de-actuation of said valve means, and time delay means connected to de-actuate said third circuit establishing means a predetermined time after actuation thereof.

6. A system for shutting down an operating main thermal prime mover having a main generator mechanically connected thereto comprising an auxiliary thermal prime mover having an auxiliary generator mechanically connected thereto, a battery, first circuit establishing means arranged when actuated electrically to connect said auxiliary generator to said battery for charging, means arranged to actuate said first circuit establishing means thereby to initiate shut-down of said main prime mover, a source of a first type of fuel for said main prime mover, first valve means arranged when actuated to admit fuel to said main prime mover, a source of a second type of fuel for said main prime mover, a second valve means arranged when actuated to connect said source of said second type of fuel to said main prime mover and when de-actuated to connect said source of said first type of fuel to said main prime mover, second circuit establishing means arranged when actuated electrically to connect said auxiliary generator to said main generator for operating the same as a motor to crank said main prime mover for cool-down cranking, means arranged to de-actuate said second valve means responsive to actuation of said first circuit establishing means thereby to transfer from said source of said second type of fuel to said source of said first type of fuel, first time delay means arranged to deactuate said first valve means a predetermined time after de-actuation of said second valve means, speed-responsive means connected to actuate said second circuit establishing means responsive to the speed of said main prime mover falling a predetermined level as a result of de-actuation of said first valve means, and second time delay means connected to de-actuate said second circuit establishing means a predetermined time after actuation thereof.

7. A system for shutting down an operating main thermal prime mover having a main generator mechanically connected thereto comprising an auxiliary thermal prime mover having an auxiliary generator mechanically connected thereto, a source of fuel for said main prime mover, valve means arranged when actuated to connect said source of fuel to said main prime mover, means arranged to de-actuate said valve means thereby to initiate shut-down of said main prime mover, circuit establishing means arranged when actuated electrically to connect said auxiliary generator to said main generator for operating the same as a motor to crank said main prime mover for cool-down cranking, first time delay means arranged to prevent re-actuation of said valve means for a predetermined time after de-actuation thereof, speed-responsive means connected to actuate said circuit establishing means responsive to the speed of said main prime mover falling below a predetermined level as a result of de-actuation of said valve means, and second time delay means connected to de-actuate said circuit establishing means a predetermined time after actuation thereof.

8. A system for shutting down an operating main thermal prime mover having a main generator mechanically connected thereto comprising an auxiliary thermal prime mover having an auxiliary generator mechanically connected thereto, a source of fuel for said main prime mover, valve means arranged when actuated to connect said source of fuel to said main prime mover, means arranged to de-actuate said valve means thereby to initiate shut-down of said main prime mover, speed-responsive means arranged electrically to connect said auxiliary generator to said main generator for operating the same as a motor to crank said main prime mover for cool-down cranking responsive to the speed of said main prime mover falling below a predetermined level as a result of de-actuation of said valve means, and time delay means arranged to disconnect said auxiliary generator from said main generator a predetermined time after operation of said speed-responsive means.

9. A system for automatically shutting down an operating main thermal prime mover having a main generator mechanically connected thereto comprising an auxiliary thermal prime mover having an auxiliary generator mechanically connected thereto, a battery, first circuit establishing means arranged when actuated electrically to connect said auxiliary generator to said battery for charging, a source of fuel for said main prime mover, valve means arranged when actuated to connect said source of fuel to said prime mover, first time delay means arranged to de-actuate said valve means a predetermined time after actuation of said first circuit establishing means, second circuit establishing means arranged when actuated electrically to connect said auxiliary generator to said main generator for operating the same as a motor to crank said main prime mover for cool-down cranking, speed-responsive means connected to actuate said second circuit establishing means responsive to the speed of said main prime mover falling below a predetermined level as a result of de-actuation of said valve means, second time delay means connected to de-actuate said second circuit establishing means a predetermined time after actuation thereof, and supervisory control means connected to actuate said first circuit establishing means.

10. A system for automatically shutting down an operating main thermal prime mover having a main generator mechanically connected thereto comprising an auxiliary thermal prime mover having an auxiliary generator mechanically connected thereto, operating means arranged when actuated to start and operate said auxiliary prime mover, a battery, first circuit establishing means arranged when actuated electrically to connect said auxiliary generator to said battery for charging, a source of fuel for said main prime mover, valve means arranged when actuated to connect said source of fuel to said prime mover, first time delay means arranged to de-actuate said valve means a predetermined time after actuation of said first circuit establishing means, a second circuit establishing means arranged when actuated electrically to connect said auxiliary generator to said main generator for operating the same as a motor to crank said main prime mover for cool-down cranking, speed-responsive means connected to actuate said second circuit establishing means responsive to the speed of said main prime mover falling below a predetermined level as a result of de-actuation of valve means, second time delay means connected to de-actuate said second circuit establishing means a predetermined time after actuation thereof, and supervisory control means connected sequentially to actuate said operating means and said first circuit establishing means.

11. A system for automatically shutting down an operating main thermal prime mover having a main generator mechanically connected thereto comprising an auxiliary thermal prime mover having an auxiliary generator mechanically connected thereto, a battery, first circuit establishing means arranged when actuated electrically to connect said auxiliary generator to said battery for charging, a source of a first type of fuel for said main prime mover, a source of a second type of fuel for said main prime mover, first valve means arranged when actuated to admit fuel to said main prime mover, second valve means arranged when actuated to connect said source of said first type of fuel to said main prime mover and when de-actuated to connect said source of said second type of fuel to said main prime mover, said first circuit establishing means being arranged when actuated to de-actuate said second valve means, first time delay means connected to de-actuate said first valve means a predetermined time after de-actuation of said second valve means, second circuit establishing means arranged when actuated electrically to connect said auxiliary generator to said main generator for operating the same as a motor to crank said main prime mover for cool-down cranking, speed-responsive means connected to actuate said second circuit establishing means responsive to the speed of said main prime mover falling below a predetermined level as a result of de-actuation of said first valve means, second time delay means connected to de-actuate said second circuit establishing means a predetermined time after actuation thereof, and supervisory control means connected to actuate said first circuit establishing means.

12. A system for automatically shutting down an operating main thermal prime mover having a main generator and a first auxiliary generator mechanically connected thereto comprising an auxiliary thermal prime mover having a second auxiliary generator mechanically connected thereto, a battery, first circuit establishing means arranged when actuated electrically to connect said first auxiliary generator to said battery for charging, second circuit establishing means arranged when actuated electrically to connect said second auxiliary generator to said battery for charging, a source of fuel for said main prime mover, valve means arranged when actuated to connect said source of fuel to said main prime mover, said second circuit establishing means being arranged when actuated to de-actuate said valve means, third circuit establishing means arranged when actuated electrically to connect said second auxiliary generator to said main generator for operating the same as a motor to crank said main prime mover for cool-down cranking, speed-responsive means connected to actuate said third circuit establishing means responsive to the speed of said main prime mover falling below a predetermined level as a result of de-actuation of said valve means, time delay means connected to de-actuate said third circuit establishing means a predetermined time after actuation thereof, and supervisory control means arranged sequentially to de-actuate said first circuit establishing means and to actuate said second circuit establishing means.

13. A system for shutting down an operating main thermal prime mover having a main generator mechanically connected thereto comprising an auxiliary thermal prime mover having an auxiliary generator mechanically connected thereto, means arranged when actuated to start and operate said auxiliary prime mover, a source of fuel for said main primer mover, valve means arranged when actuated to connect said source of fuel to said main prime mover, circuit establishing means arranged when actuated electrically to connect said auxiliary generator to said main generator for operating the same as a motor to crank said main prime mover for cool-down cranking, supervisory control means arranged to actuate said starting and operating means in a first position, to actuate said circuit establishing means in a second position, and to de-actuate said valve means in a third position, speed-responsive means arranged to render ineffective said circuit establishing means until the speed of said main prime mover has fallen below a predetermined level as a result of de-actuation of said valve means, and time delay means connected to de-actuate said circuit establishing means a predetermined time after actuation thereof.

14. A system for shutting down an operating main thermal prime mover having a main generator mechanically connected thereto comprising an auxiliary thermal prime mover having an auxiliary generator mechanically connected thereto, means arranged when actuated to start and operate said auxiliary prime mover, a battery, first circuit establishing means arranged when actuated electrically to connect said auxiliary generator to said battery for charging, a source of fuel for said main prime mover, valve means arranged when actuated to connect said source of fuel to said main prime mover, second circuit establishing means arranged when actuated electrically to connect said auxiliary generator to said main generator to operate same as a motor to crank said main prime mover for cool-down cranking, supervisory control means arranged to actuate said starting and operating means in a first position, to actuate said first and second circuit establishing means in a second position, and to de-actuate said valve means in a third position, speed-responsive means arranged to render ineffective said second circuit establishing means until the speed of said main prime mover has fallen below a predetermined level as a result of de-actuation of said valve means, and time delay means connected to de-actuate said second circuit establishing means a predetermined time after actuation thereof.

15. A system for shutting down an operating main thermal prime mover having a main generator mechanically connected thereto comprising an auxiliary thermal prime mover having an auxiliary generator mechanically connected thereto, means arranged when actuated to start and operate said auxiliary prime mover, a battery, first circuit establishing means arranged when actuated electrically to connect said auxiliary generator to said battery for charging, a source of fuel for said main prime mover, valve means arranged when actuated to connect said source of fuel to said main prime mover, second circuit establishing means arranged when actuated electrically to connect said auxiliary generator to said main generator to operate same as a motor to crank said main prime mover for cool-down cranking, supervisory control means arranged to actuate said starting and operating means in a first position, to actuate said first and second circuit establishing means in a second position, and to de-actuate said valve means in a third position, first time delay means connected to keep said valve means actuated until a predetermined time after actuation of said first circuit establishing means, speed-responsive means arranged to render ineffective said second circuit establishing means until the speed of said main prime mover has fallen below a predetermined level as a result of de-actuation of said valve means, and second time delay means connected to de-actuate said second circuit establishing means a predetermined time after actuation thereof.

16. A system for shutting down an operating main thermal prime mover having a main generator mechanically connected thereto comprising an auxiliary thermal prime mover having an auxiliary generator mechanically connected thereto, means arranged when actuated to start and operate said auxiliary prime mover, a source of fuel for said main prime mover, valve means arranged when actuated to connect said source of fuel to said main prime mover, means arranged to de-actuate said valve means thereby to initiate shut-down of said main prime mover, circuit establishing means arranged when actuated electrically to connect said auxiliary generator to said main generator for operating the same as a motor to crank said main prime mover for cool-down cranking, means responsive to current flow in said main generator connected to actuate said circuit establishing means responsive to the speed of said main prime mover falling below a predetermined level as a result of de-actuation of said valve means, and time delay means connected to de-actuate said circuit establishing means a predetermined time after actuation thereof.

17. A system for shutting down an operating main thermal prime mover having a main generator mechanically connected thereto comprising an auxiliary thermal prime mover having an auxiliary generator mechanically connected thereto, means arranged when actuated to start and operate said auxiliary prime mover, a source of a first type of fuel for said main prime mover, a source of a second type of fuel for said main prime mover, first valve means arranged when actuated to admit fuel to said main prime mover, second valve means arranged when actuated to connect said source of said first type of fuel to said main prime mover and when de-actuated to connect said source of said second type of fuel to said main prime mover, circuit establishing means arranged when actuated electrically to connect said auxiliary generator to said main generator for operating the same as a motor to crank said main prime mover for cool-down cranking, supervisory control means arranged to actuate said starting and operating means in a first position, to actuate said circuit establishing means and de-actuate said second valve means in the second position, and to de-actuate said first valve means in a third position, first time delay means connected to prevent de-actuation of said first valve means for a predetermined time after de-actuation of said second valve means, speed-responsive means arranged to render ineffective said circuit establishing means until the speed of said main prime mover falls below a predetermined level as a result of de-actuation of said first valve means, and second time delay means connected to de-actuate said circuit establishing means a predetermined time after actuation thereof.

18. A system for shutting down an operating main thermal prime mover having a main generator mechanically connected thereto comprising an auxiliary thermal prime mover having an auxiliary generator mechanically connected thereto, means arranged when actuated to start and operate said auxiliary prime mover, a source of fuel for said main prime mover, valve means arranged when actuated to connect said source of fuel to said main prime mover, circuit establishing means arranged when actuated electrically to connect said auxiliary generator to said main generator for operating the same as a motor to crank said main prime mover for cool-down cranking, supervisory control means arranged to actuate said starting and operating means in a first position, to actuate said circuit establishing means in a second position, and to de-actuate said valve means in a third position, speed-responsive means arranged to prevent actuation of said circuit establishing means until the speed of said main prime mover falls below a predetermined level as a result of de-actuation of said valve means, time delay means connected to de-actuate said circuit establishing means after a predetermined time delay, said supervisory control means actuating said time delay means in a fourth position.

19. A system for shutting down an operating main thermal prime mover having a main generator and a first auxiliary generator mechanically connected thereto comprising an auxiliary prime mover having a second auxiliary generator mechanically connected thereto, means arranged when actuated to start and operate said auxiliary prime mover, a battery, first circuit establishing means arranged when actuated electrically to connect said first auxiliary generator to said battery for charging, second circuit establishing means arranged when actuated electrically to connect said second auxiliary generator to said battery for charging, a source of fuel for said main prime mover, valve means arranged when actuated to admit fuel to said main prime mover, third circuit establishing means arranged when actuated electrically to connect said second auxiliary generator to said main generator for operating the same as a motor to crank said main turbine prime mover for cool-down cranking, supervisory control means arranged to actuate said starting and operating means in a first position, to actuate said second and third circuit establishing means and de-actuate said first circuit establishing means in a second position, and to de-actuate said valve means in a third position, speed-responsive means arranged to render ineffective said third circuit establishing means until the speed of said main prime mover has fallen below a predetermined level as a result of de-actuation of said valve means, and time delay means connected to de-actuate said circuit establishing means a predetermined time after actuation thereof.

THURLOW J. WARRICK.
CARL A. BRANCKE.

References Cited in the file of this patent

UNITED STATES PATENTS

| Number | Name | Date |
|---|---|---|
| 1,139,521 | Heany | May 18, 1915 |
| 1,409,756 | Lea | Mar. 14, 1922 |
| 2,070,615 | Plante | Feb. 16, 1937 |
| 2,298,309 | Ray | Oct. 13, 1942 |
| 2,405,676 | Strub | Aug. 13, 1946 |
| 2,503,289 | Nettel | Apr. 11, 1950 |
| 2,624,849 | Bennett-Powell | Jan. 6, 1953 |